United States Patent [19]

Bock et al.

[11] Patent Number: 4,907,762
[45] Date of Patent: Mar. 13, 1990

[54] LUGGAGE RACK FOR VEHICLES, ESPECIALLY AIRCRAFT

[75] Inventors: Thomas Bock, Aussone; Günther Schwertfeger, Tournefeuille, both of France

[73] Assignee: Deutsche Airbus GmbH

[21] Appl. No.: 280,129

[22] Filed: Dec. 5, 1988

[30] Foreign Application Priority Data

Dec. 4, 1987 [DE] Fed. Rep. of Germany ....... 3741164

[51] Int. Cl.$^4$ ............................ B24C 1/20; B24C 1/22
[52] U.S. Cl. .................................................. 244/118.1
[58] Field of Search ................... 244/118.1, 118.5, 140; 105/334; 224/311, 42.41

[56] References Cited

U.S. PATENT DOCUMENTS

| | | | |
|---|---|---|---|
| 2,577,263 | 12/1951 | Myers | 224/311 |
| 3,522,919 | 8/1970 | Bader | 244/118.1 |
| 3,700,199 | 10/1972 | Matuska | 244/118.1 |

Primary Examiner—Charles T. Jordan
Assistant Examiner—Rochelle Lieberman
Attorney, Agent, or Firm—Toren, McGeady & Associates

[57] ABSTRACT

The invention is directed to a luggage rack for vehicles, especially aircraft, which is subdivided into individual compartments by means of separation walls and is arranged in the longitudinal direction of the vehicle with an overhead configuration with respect to the passengers and whose individual compartments are respectively closeable by means of a lid.

10 Claims, 1 Drawing Sheet

LUGGAGE RACK FOR VEHICLES, ESPECIALLY AIRCRAFT

BACKGROUND OF THE INVENTION

The invention is directed to a luggage rack for vehicles, especially aircraft, which is subdivided by means of separation walls into individual compartments and is arranged in the longitudinal direction of the vehicle in an overhead configuration with respect to the passengers and whose individual compartments can be closed respectively by a lid.

Such luggage racks are installed in buses, railroad cars and aircraft, as is well known, wherein it was assumed that a complete security against dropping out and falling down of the luggage pieces is assured by means of a lid closing off an individual compartment. This assumption was not confirmed in actual operation, since when opening the lid the luggage pieces very often slide towards the unprepared passenger operating the lid and fall upon the passenger sitting beneath the luggage rack with considerable consequences of personal injury or luggage damage from falling upon the floor. The lids could equally well open during the vehicle or aircraft operation by themselves with the previously mentioned consequences.

SUMMARY OF THE INVENTION

Accordingly, it is an object of the present invention to improve an overhead luggage rack in such a way that the luggage pieces are always completely secured against dropping out or falling down, where however no impediment of any sort, while opening the lid during the loading or unloading process, can occur.

This task is solved by a luggage rack having separation walls defining individual compartments, and a lid provided to close the compartments. The lid is upwardly swivelable and includes arms arranged on its sides, which arms are rotatably articulated at bearings provided in the separation walls. A safety flap oriented towards the inside of the lid is also supported by the bearings. A spring retains the safety flap in a locked position so as to secure pieces of luggage when the lid is opened. The safety flap is also upwardly displaceable into a position releasing the pieces of luggage with the application of slight manual force and with the help of the spring traveling beyond dead center. The safety flap is returnable into the locking position by driving means arranged at an arm of the lid.

The advantages of the invention are especially substantiated in that the luggage pieces are securely restrained and cannot slide outside of the predetermined contour nor fall out in a head injury threatening manner for the passenger opening the lid even in case of improper storage in the luggage rack, for instance by oblique positioning because of a garment. The catching or the restraining of the luggage pieces is on the one hand secured in the right position by the effect of their weight upon the safety flap or its lip and on the other hand an endangered luggage piece is recognizable through the transparent material of the safety flap and this situation can be immediately corrected by means of a securing catching motion or by manually gripping thorough the cutouts provided in the safety flap. This is of great importance if the overhead luggage rack tapers downwards in order to achieve a sufficient loading height with maximum space utilization for the luggage and if, for instance, an overhang is formed by a suitcase since it can become unbalanced with the consequences to be expected. Furthermore, the safety flap does not constitute an impediment either for the personnel or for the passenger during the opening- or loading- or unloading process of the luggage rack, since the safety flap can be pivoted during these processes either manually or automatically out of the loading or unloading envelope.

A preferred embodiment of the invention will be described below in connection with the accompanying drawing.

DETAILED DESCRIPTION OF THE PREFERRED EMBODIMENT

Figure 1:
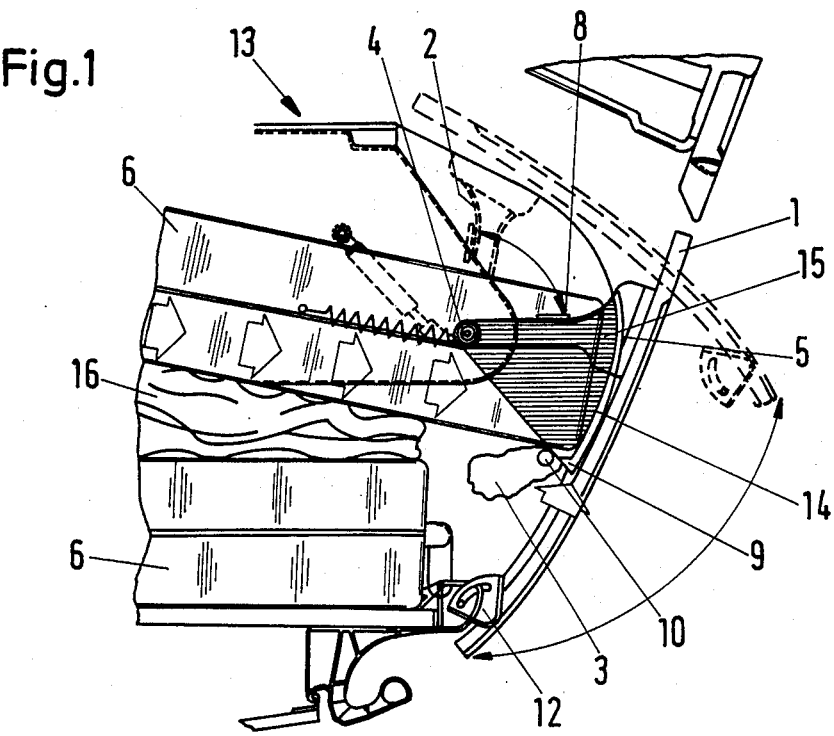
FIG. 1 is a section through a luggage rack pursuant to the present invention with the lid closed in diagrammatic presentation.

The lid 1 is discernible from FIG. 1 which is pivotably articulated at bearings 4 by means of arms 2, and which is depicted in a lowered position, a position in which it completely closes the luggage rack 1 and in which it is locked or secured at 12. At the same bearing 4 which is arranged at side separation walls 3 forming the individual compartments of the luggage rack, a safety flap 5 facing towards the inner side of the lid 1 is also supported. The flap 5 can consist of a front face 14 and side portions 15 for the support thereof.

In the position shown the safety flap 5 already restrains a piece of luggage 6, for instance a suitcase, which is in an oblique position because of a garment 16, in this case an overcoat. Herein the suitcase 6 presses with its weight in the direction of the arrow against the lower portion of the safety flap 5 and presses it for a secure abutment against a stop point or contact point 10 fastened at the separation wall 3. A lip 9 arranged at the safety flap 5 can form another contact point for the suitcase and prevents simultaneously the suitcase from from sliding through beneath the flap. An additional restraining point is formed further down by an arresting device at 12.

Figure 2:
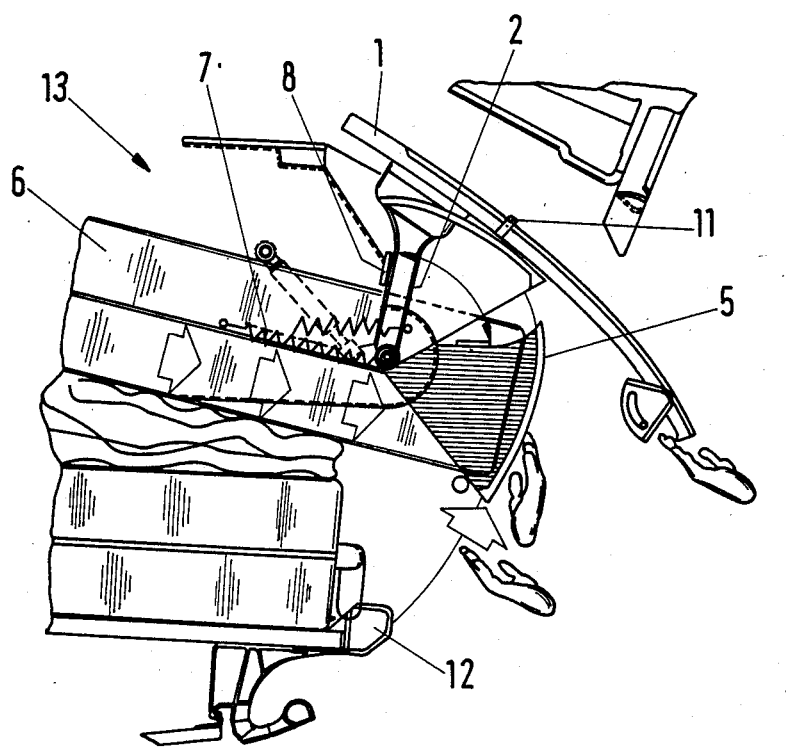
FIG. 2 is a section through the luggage rack in FIG. 1, with the lid open.

The lid 1 which is swivelable upwards in the direction of the arrow is shown in FIG. 2 in the open position, whereby the safety flap 5 continues to restrain the luggage piece 6 which otherwise would fall down. The passenger removing the luggage piece 6 can recognize the endangered position of the piece of luggage 6 through the transparent material of the safety flap 5 and is able to safely catch the endangered suitcase by pushing the safety flap 5 upwards with one hand, and with a simultaneous catching movement with the other hand, as is depicted in FIG. 2. The safety flap 5 can additionally have cutouts, which are not depicted here, in the front face 14, permitting the passenger to manually push back the piece of luggage 6 prior to pivoting the safety flap 5. A spring 7 or a similar force accumulator articulated to the separation wall 3 can serve as an assist during the pivoting motion of the safety flap 5. The spring swivels the safety flap upwards if the load is not present, for instance, by exceeding dead center, meaning over and beyond the bearing 4.

A driving device 8 provided at the arm 2 moves the safety flap 5 together with the swiveling motion of the lid 1 again into the approximately horizontal closed position, in which it can be retained upon the stop point or support point 10 by means of the spring traveling beyond the point of rotation. This swiveling travel is indicated by means of the circular arc arrow in FIGS. 1 and 2.

The safety flap 5 can additionally be connected with the lid 1 by means of another driving device 11, which, because of a slight frictional lock, moves the safety flap 5 upwards together with the lid 1, in order to enable an unimpeded loading of the luaggage rack 13 by the passengers.

For the same reason, so that the additional driving device 11 can be actuated by the personnel and by the passenger in a known and therefore not depicted manner in such a way when raising the lid 1, an appropriately slight frictional lock possibly of short duration is formed, due to which the safety flap 5 is also swiveled upwards together with the lid 1.

Thus, a luggage rack safe for the passenger is provided which assures the complete securing of the pieces of luggage automatically or with very easy operability.

What is desired to be protected by letters patent is set forth in the following claims.

We claim:

1. A luggage rack for a vehicle, arranged in a longitudinal direction of the vehicle and in an overhead configuration with respect to passengers, comprising:
    separation walls provided so as to subdivide the rack into individual compartments;
    a lid provided so that the individual compartments can be respectively closed off, the lid being swivelable upward and having arms arranged on its sides, the arms being rotatably articulated at bearings provided at the separation walls; and
    a safety flap oriented towards the inside of the lid and additionally supported at the bearings, the safety flap being retainable in a locked position by means of a spring fastened at the separation wall so as to secure pieces of luggage when the lid is opened, the safety flap also being displaceable upwards into a position releasing the pieces of luggage with a slight manual force application and with the help of the spring traveling beyond dead center, the safety flap being returnable into the locked position by driving means arranged at an arm of the lid, all this by a closing motion of the lid downwards.

2. A luggage rack according to claim 1, wherein the safety flap incorporates a downwardly pointing lip provided so that the safety flap is pressable downwards by weight of the luggage pieces in a direction of a stop point on the separation walls.

3. A luggage rack according to claim 2, wherein the safety flap is pressable against the stop point.

4. A luggage rack according to claim 1, wherein the safety flap is formed of a transparent material.

5. A luggage rack according to claim 1, wherein the safety flap includes cutouts provided so as to allow accessibility to the pieces of luggage.

6. A luggage rack according to claim 1, wherein the spring is arranged at the separation wall and at the safety flap so as to be spaced away from the bearing, so that when a load on the safety flap by the luggage pieces is not present, the safety flap is automatically pivotable upwards.

7. A luggage rack according to claim 1, and further comprising an additional driving device acting with a slight frictional lock provided between the safety flap and the lid, by means of which driving device the safety flap is moveable upwards together with the lid in case no load is acting upon the safety flap.

8. A luggage rack according to claim 7, wherein the additional driving device is manually actuable by means of frictional lock.

9. A luggage rack according to claim 7, wherein the additional driving device is provided at only one of the safety flap and the lid.

10. A luggage rack according to claim 1, wherein the vehicle is an aircraft.

* * * * *